Apr. 10, 1923.

G. W. WILMOT

DRIVE CHAIN

Filed Sept. 1, 1920

1,451,286

INVENTOR.
George W. Wilmot
BY
Cyrus N. Anderson
ATTORNEY.

Patented Apr. 10, 1923.

1,451,286

UNITED STATES PATENT OFFICE.

GEORGE W. WILMOT, OF HAZLETON, PENNSYLVANIA, ASSIGNOR TO WILMOT ENGINEERING COMPANY, OF HAZLETON, PENNSYLVANIA, A CORPORATION OF PENNSYLVANIA.

DRIVE CHAIN.

Application filed September 1, 1920. Serial No. 407,364.

*To all whom it may concern:*

Be it known that I, GEORGE W. WILMOT, a citizen of the United States, and a resident of Hazleton, in the county of Luzerne and State of Pennsylvania, have invented an Improvement in Drive Chains, of which the following is a specification.

My invention relates to drive chains in which the links thereof consist of single bars and it has for one of its objects to provide a simple and efficient means of connection of the adjoining ends of any two links.

The invention also has for one of its objects to provide replaceable wearing means intermediate projections upon the opposite ends of the links and means for engaging the said projections to connect the adjacent ends of any two adjoining links.

Other objects and advantages of my invention will be pointed out in the detailed description thereof which follows or will be apparent from such description.

In order that the invention may be readily understood and its practical commercial advantages fully appreciated, reference may be had to the accompanying drawing in which I have illustrated certain forms of embodiment thereof.

Figure 1:
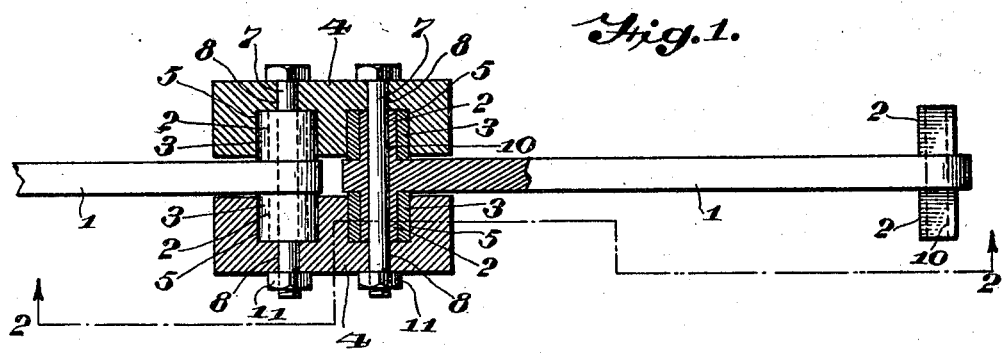
Fig. 1 is a view partly in longitudinal horizontal section and partly in top plan view.
Figure 2:
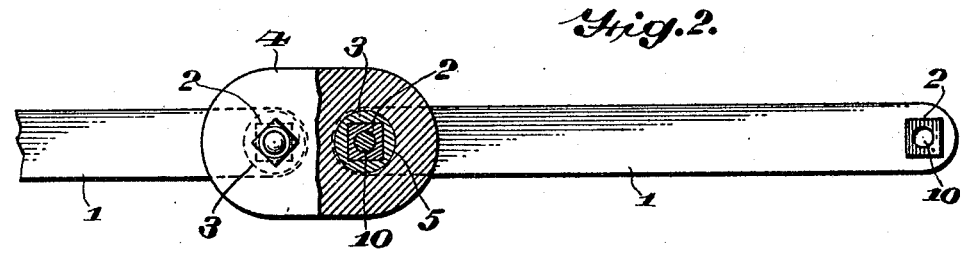
Fig. 2 is a view partly in side elevation and partly in section taken on the line 2—2 of Fig. 1.

Referring to Figs. 1 and 2 of the drawing: 1 designates the links of a chain, each link, as shown, consisting of a single bar having laterally and oppositely extending projections 2 adjacent its opposite ends. The projections in the construction shown in these two figures are rectangular in cross section although they may be of other polygonal section. 3 designates wearing collars or sleeves having openings therethrough of the same cross sectional shape as the projections 2. These wearing collars or sleeves 3 are fitted upon the projections 2, as is clearly shown in the drawing.

For the purpose of connecting adjacent ends of adjoining links 1 together, I have provided the connecting blocks 4, which blocks are situated upon opposite sides of adjacent end portions of adjoining links, as is shown. Each of these blocks is provided with two openings or sockets 5 which are situated in adjacent relation with respect to each other upon the inner sides of the said blocks. These openings 5 are adapted to receive the wearing sleeves 3 previously referred to. These sleeves are shown in position in Figs. 1 and 2 of the drawing. For the purpose of securing and holding the connecting blocks 4 in position upon opposite sides of the adjacent end portions of adjoining links, I have provided the bolts 7 which extend through the openings 8 in the connecting blocks 4, which openings are concentric with the openings or sockets 5. These bolts likewise extend through openings 10 which extend through the ends of the links 1 and through the lateral projections 2. After the connecting blocks 4 are placed in position upon opposite sides of the adjacent end portions of adjoining links with the wearing sleeves or collars 3 and the projections 2 extending into the openings or sockets 5, the bolts 7 are inserted through the openings 8 in the blocks and through the openings 10, after which the nuts 11 are placed in position upon the screw-threaded ends thereof to retain the same.

It will be observed that in the use of the chain the wear of the blocks 4 will be upon the inner surface portions of the sleeves or collars 3 and not upon the projections 2. When the inner portions of these sleeves or collars have become too greatly worn, the bolts 7 and the connecting blocks 4 may be removed to permit the removal and turning of the wearing sleeves so as to subject diametrically oppositely disposed portions of the sleeves to wear. If the sleeves should become worn out they may be removed and replaced by other new sleeves. In this way the life of the chain may be greatly enhanced or lengthened.

It will be apparent that the last described feature of my invention comprising wearing collars or sleeves is not necessarily limited to a construction in which the links employed consist of single bars, as shown, but links of other design and construction may be employed in connection with said collars or sleeves.

Figure 3:
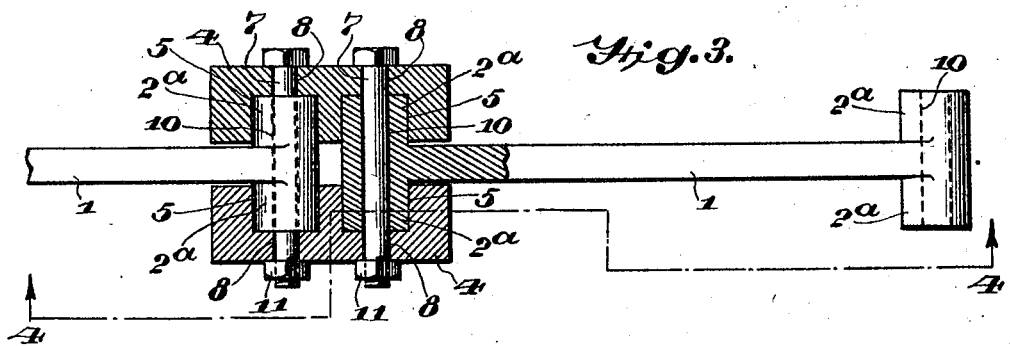
Fig. 3 is a view similar to that shown in Fig. 1 but showing a modification of the construction.
Figure 4:
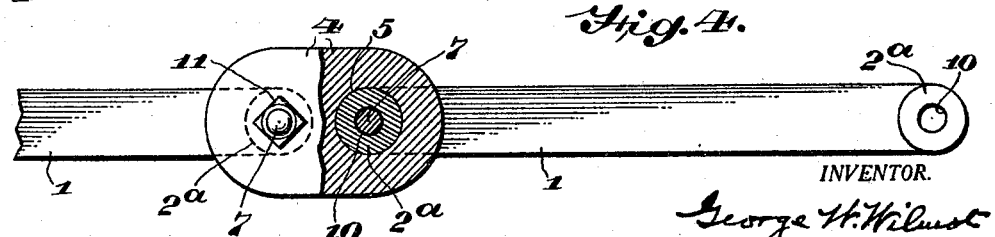
Fig. 4 is a view partly in side elevation and partly in section taken on the line 4—4 of Fig. 3.

Although I prefer to employ the form of construction as shown in Figs. 1 and 2, it will be apparent that the wearing sleeves 3 may be omitted, consequently in Figs. 3 and 4 I have shown a construction which does not include these sleeves. In these Figs. 3 and 4, 1 designates the single bar links and 2ª the laterally oppositely disposed projections at the opposite ends thereof, which projections are circular in cross section. In this construction, as in that shown in Figs. 1 and 2, connecting blocks 4 are employed which are provided with openings or sockets 5 upon the inner sides thereof. The projections 2ª are adapted to enter these openings or sockets 5 when the connecting blocks 4 are placed in position upon opposite sides of the adjacent end portions of adjoining links. The connecting blocks 4 are connected together and to the adjacent end portions of adjoining links by means of bolts 7 which extend through openings 8 in the connecting blocks and openings 10 in the ends of the links and the projections 2ª. These bolts are retained in position by means of nuts 11.

It will be observed that in this construction the projections contact directly with the connecting blocks 4 and that the wear comes directly upon the said projections. It will be apparent, therefore, that when these projections are worn so that they may not be further or longer used, it is necessary to discard the whole link. While this construction is very satisfactory and when employed produces a very satisfactory and efficient chain structure, for economical reasons the construction shown in Figs. 1 and 2, in which the wearing collars or sleeves are employed, is preferred.

In both forms of construction the bolts 7 co-operate with the blocks 4 in taking up and resisting the strain exerted by the pull upon the chains when the latter are in use.

It is apparent that the adjacent ends of any two adjoining links may be disconnected readily by removing the bolts and the connecting blocks from engagement with the said links.

Having thus described my invention, what I claim, and desire to secure by Letters Patent, is:—

1. A drive chain comprising links, each of which consists of a single bar having laterally extending projections at its opposite ends, connecting blocks situated on opposite sides of adjacent end portions of adjoining links, said blocks having adjacent sockets into which the said projections extend, and bolts extending through said connecting blocks and said projections for connecting the said blocks and adjacent ends of adjoining links.

2. A drive chain comprising links each of which is provided adjacent its opposite ends with laterally extending projections and with openings which extend therethrough and through said projections, connecting blocks situated on opposite sides of adjacent end portions of adjoining links, said blocks having sockets in their inner sides into which said projections extend, and also having holes which extend outwardly from the bottoms of said sockets, and bolts which extend through the holes in said blocks and links to connect said blocks to said links and to each other.

3. A drive chain comprising links each of which is provided with a lateral projection at its opposite ends, wearing sleeves fitting said projections, connecting blocks engaging said projections, and a plurality of means for connecting said connecting blocks to the adjacent ends of any two adjoining links, one of said means extending through an end of one of said links and the other through the adjacent end of the other link.

4. A drive chain comprising links, each of which is provided at its opposite ends with laterally and oppositely extending projections which are polygonal in cross section, wearing sleeves having openings therethrough of like cross section which fit over the said projections, the said sleeves being rotatably adjustable and being circular in cross section, connecting blocks situated on opposite sides of adjacent ends of adjoining links, said blocks each having sockets adjacent each other which are circular in cross section and into which the said projections are adapted to extend, and means for connecting said blocks to said links.

5. A drive chain comprising links each of which is provided at its opposite ends with laterally and oppositely extending projections polygonal in cross section, replaceable wearing sleeves upon said projections, said sleeves having openings therethrough of the same cross sectional area as the said projections, connecting blocks situated on opposite sides of adjacent end portions of adjoining links, said blocks having socket openings upon their inner sides into which the said sleeves and projections extend, and means for securing said blocks to said links.

In testimony that I claim the foregoing as my invention, I have hereunto signed my name this 26th day of August A. D., 1920.

GEORGE W. WILMOT.